(12) United States Patent
Lin et al.

(10) Patent No.: US 12,153,658 B2
(45) Date of Patent: Nov. 26, 2024

(54) ELECTRONIC CIGARETTE (E-CIGARETTE) FOR PREVENTING MINORS FROM USING AND CONTROL METHOD THEREOF

(71) Applicant: HUIZHOU HAPPY VAPING TECHNOLOGY LIMITED, Guangdong (CN)

(72) Inventors: Guangrong Lin, Guangdong (CN); Xianbin Zheng, Guangdong (CN); Xiyong Zhang, Guangdong (CN)

(73) Assignee: HUIZHOU HAPPY VAPING TECHNOLOGY LIMITED, Huizhou (CN)

( * ) Notice: Subject to any disclaimer, the term of this patent is extended or adjusted under 35 U.S.C. 154(b) by 269 days.

(21) Appl. No.: 17/861,242

(22) Filed: Jul. 10, 2022

(65) Prior Publication Data

US 2022/0342971 A1 Oct. 27, 2022

Related U.S. Application Data

(63) Continuation-in-part of application No. PCT/CN2020/129223, filed on Nov. 17, 2020.

(30) Foreign Application Priority Data

Jan. 10, 2020 (CN) .......................... 202010030436.0

(51) Int. Cl.
*A24F 40/53* (2020.01)
*A24F 40/49* (2020.01)
(Continued)

(52) U.S. Cl.
CPC .............. *G06F 21/32* (2013.01); *A24F 40/49* (2020.01); *A24F 40/51* (2020.01); *A24F 40/53* (2020.01);
(Continued)

(58) Field of Classification Search
CPC .......... G06F 21/32; G06F 21/44; A24F 40/49; A24F 40/51; A24F 40/53; A24F 40/60; A24F 40/65
(Continued)

(56) References Cited

U.S. PATENT DOCUMENTS

| 2011/0122059 A1* | 5/2011 | Guerrero | ............ G06V 40/1306 345/156 |
| 2018/0093054 A1* | 4/2018 | Bowen | ................. A61M 11/042 |

(Continued)

FOREIGN PATENT DOCUMENTS

| CN | 108308717 A | 7/2018 |
| CN | 109581937 A | 4/2019 |

(Continued)

OTHER PUBLICATIONS

International Search Report of PCT Patent Application No. PCT/CN2020/129223 issued on Jan. 27, 2021.

*Primary Examiner* — Sharon S Lynch
*Assistant Examiner* — Pegah Barzegar

(57) ABSTRACT

Disclosed are an electronic cigarette, e-cigarette, for preventing minors from using and a control method thereof. The e-cigarette includes a vaporization assembly and a battery assembly, where the vaporization assembly is provided therein with a vaporization device; the battery assembly includes a casing, a holder, a battery, and a control circuit; the control circuit includes an output power control unit, a storage control unit, a personal biometric information acquisition unit, a prompt unit, and a communication unit; the personal biometric information acquisition unit is configured to acquire and input a user's personal biometric information into the storage control unit; and when the storage control unit stores or changes the user's authorized personal biometric information, the storage control unit utilizes an external device and special software that are (Continued)

authorized to complete the storage or change. The personal biometric information acquisition unit acquires personal biometric information for verification and authorization.

11 Claims, 7 Drawing Sheets

(51) Int. Cl.
  *A24F 40/51* (2020.01)
  *A24F 40/60* (2020.01)
  *A24F 40/65* (2020.01)
  *G06F 21/32* (2013.01)
  *G06F 21/44* (2013.01)
(52) U.S. Cl.
  CPC .............. *A24F 40/60* (2020.01); *A24F 40/65* (2020.01); *G06F 21/44* (2013.01)

(58) Field of Classification Search
  USPC .......................................................... 713/186
  See application file for complete search history.

(56) References Cited

U.S. PATENT DOCUMENTS

| | | | |
|---|---|---|---|
| 2018/0213849 A1* | 8/2018 | Qiu | A24F 40/60 |
| 2020/0050829 A1* | 2/2020 | Akcasu | G06V 40/1365 |
| 2020/0138106 A1* | 5/2020 | Huang | A24F 40/60 |
| 2020/0394291 A1* | 12/2020 | Khalifa | A24F 40/65 |
| 2022/0053836 A1* | 2/2022 | Cazzoli | A61B 5/0077 |
| 2022/0342971 A1* | 10/2022 | Lin | G06F 21/44 |

FOREIGN PATENT DOCUMENTS

| | | | |
|---|---|---|---|
| CN | 111145399 A | * | 5/2020 |
| CN | 210573971 U | * | 5/2020 |
| CN | 211746996 U | | 10/2020 |

* cited by examiner

ELECTRONIC CIGARETTE (E-CIGARETTE) FOR PREVENTING MINORS FROM USING AND CONTROL METHOD THEREOF

CROSS REFERENCE TO RELATED APPLICATIONS

The present application is a Continuation-In-Part Application of PCT Application No. PCT/CN2020/129223 filed on Nov. 17, 2020, which claims the benefit of Chinese Patent Application No. 202010030436.0 filed on Jan. 10, 2020. All the above are hereby incorporated by reference in their entirety.

TECHNICAL FIELD

The present invention relates to the technical field of electronic cigarettes (e-cigarettes). More specifically, the present invention relates to an electronic cigarette for preventing minors from using and a control method thereof.

BACKGROUND

Electronic cigarettes (e-cigarettes) include heat-not-burn (HNB), vaporization and medical types. Generally, they heat tobacco shreds, or liquid and paste substances such as e-liquids and medicines to produce aerosols or vapors for users to inhale. Compared with traditional cigarettes that directly burn tobacco, e-cigarettes are widely used because they are free from tar and many harmful particles. With the advancement of medical technology, some medicines can be dissolved into a liquid and vaporized for inhalation, so medical e-cigarettes are gradually being used.

The existing e-cigarettes are often used without restriction, especially for minors, who can buy and use e-cigarettes on the Internet in large quantities. Excessive use in a short period of time and ingestion of excessive amounts of e-liquids or drugs will inevitably cause adverse effects on the body. Therefore, it is urgent to strictly restrict the purchase and use of e-cigarettes by minors.

SUMMARY

Technical Problem

The purpose of the present invention is to provide an electronic cigarette (e-cigarette) for preventing minors from using and a control method thereof in order to overcome the shortcomings of the above technology.

Technical Solutions

A technical solution of the present disclosure is implemented as follows. An e-cigarette for preventing minors from using includes a vaporization assembly and a battery assembly, where the vaporization assembly is provided therein with a vaporization device; the battery assembly includes a casing, and a holder, a battery and a control circuit that are provided in the casing; the control circuit includes an output power control unit, a storage control unit, a personal biometric information acquisition unit, a prompt unit, and a communication unit; the battery is configured to provide power to the vaporization device and the control circuit; the vaporization device is configured to produce a vapor after being energized; the personal biometric information acquisition unit is configured to acquire and input a user's personal biometric information into the storage control unit; the storage control unit is configured to identify the acquired personal biometric information based on pre-stored personal biometric information, and control the e-cigarette to enter a standby state; the communication unit is configured to connect an external device and the storage control unit for data communication; when the storage control unit stores or changes the user's personal biometric information, the storage control unit utilizes the external device and special software that are authorized to complete the storage or change; and personal biometric information of a minor is forbidden to be stored in the e-cigarette.

Preferably, the personal biometric information acquisition unit may be a fingerprint information acquisition unit, an iris information acquisition unit, a face information acquisition unit, or a voice information acquisition unit.

Preferably, the prompt unit may be a liquid crystal display (LCD) screen, a vibration motor, an indicator light, a buzzer, or a voice announcer.

Preferably, the fingerprint information acquisition unit may include a fingerprint sensor and a fingerprint processing module.

Preferably, the fingerprint sensor may be a circular touchpad with a diameter of 8 mm.

Preferably, the fingerprint processing module may include a chip U1 with 40 pins; in the chip, a pin 1 may be connected in series with a capacitor C19 and then grounded, a pin 3 may be connected in series with a capacitor C6 and then grounded, and a pin 4 may be connected to one terminal of a resistor R9; the other terminal of the resistor R9 may be connected to the fingerprint sensor and one terminal of a transient voltage suppressor TVS1, and the other terminal of the transient voltage suppressor TVS1 may be grounded; a capacitor C7 may be connected in series between the pin 4 and a pin 40; a pin 5 may be connected to a power supply terminal VDD; the pin 5 may be also connected to one terminal of each of parallel capacitors C8 and C15, and the other terminal of each of the parallel capacitors C8 and C15 may be grounded; a pin 8 may be connected in series with a capacitor C25 and then grounded; a pin 10 may be connected to one terminal of a resistor R10, and the other terminal of the resistor R10 may be connected to a data interrupt signal terminal INT; a pin 11 may be connected to a data input signal terminal SPI-MOSI, a pin 12 may be connected to a data output signal terminal SPI-MISO, a pin 13 may be connected to a data clock signal terminal SPI-CLK, and a pin 14 may be connected to a communication enable signal terminal SPI-CS; a pin 37 may be grounded, and a pin 38 may be connected in series with a capacitor C16 and then grounded; and a pin 39 may be connected to one terminal of each of a resistor R14 and a capacitor C17 connected in parallel, and the other terminal of each of the resistor R14 and the capacitor C17 connected in parallel may be grounded.

Preferably, the storage control unit may include a chip MCU with 40 pins; in the chip MCU, a pin 3 may be connected to a power supply terminal VDD; the pin 3 may be also connected in series with a capacitor C21 and then grounded; a pin 4 may be connected to a reset signal terminal NRST, a pin 5 may be connected to a microphone signal terminal MIC, a pin 7 may be connected to a power supply terminal VDD, and a pin 8 may be grounded; a pin 9 and a pin 10 each may be connected to a power supply terminal VDD; the pin 9 may be also connected in series with a capacitor C22 and then grounded; the pin 10 may be also connected in series with a capacitor C23 and then grounded; a pin 11 may be connected in series with a capacitor C24 and then grounded; a pin 13 may be connected to a motor drive enable signal terminal MO-EN; a pin 19 and a pin 21 may be connected to a power supply terminal VDD; the pin 19 may be also connected in series with a capacitor C20 and then grounded; a pin 20 may be connected in series with a capacitor C4 and then grounded; a pin 24 may be grounded; a pin 28 may be connected to a blue light signal terminal LED-BLUE, a pin 29 may be connected to a green light signal terminal LED-GREEN, and a pin 30 may be connected to a red light signal terminal LED-RED; a pin 36 may be connected to a data interrupt signal terminal INT; a pin 37 may be connected to a communication enable signal terminal SPI-CS; a pin 38 may be connected to a data clock signal terminal SPI-CLK; a pin 39 may be connected to a data input signal terminal SPI-MOSI; and a pin 40 may be connected to a data output signal terminal SPI-MISO.

Preferably, the microphone signal terminal MIC may be connected to a pin 2 of a microphone; a pin 1 of the microphone may be grounded; a pin 3 of the microphone may be connected to a power supply terminal VDD and one terminal of a capacitor C10; and the other terminal of the capacitor C10 may be grounded.

Preferably, the prompt unit may include red, green and blue light-emitting diode (LED) lights; anodes of the red, green and blue LED lights may be connected to a power supply terminal VDD; a cathode of the red LED light may be connected to one terminal of a resistor R23, and the other terminal of the resistor R23 may be connected to a red light signal terminal LED-RED; a cathode of the green LED light may be connected to one terminal of a resistor R18, and the other terminal of the resistor R18 may be connected to a green light signal terminal LED-GREEN; and a cathode of the blue LED light may be connected to one terminal of a resistor R6, and the other terminal of the resistor R6 may be connected to a blue light signal terminal LED-BLUE.

Preferably, the prompt unit may include a vibration motor, which may be connected in parallel with a diode D1 and a capacitor C18; a cathode terminal of the diode D1 may be connected to a power supply terminal VDD, and an anode terminal of the diode D1 may be connected to a collector of a transistor Q3; an emitter of the transistor Q3 may be grounded; and a base of the transistor Q3 may be connected to one terminal of a resistor R2, and the other terminal of the resistor R2 may be connected to a motor drive enable signal terminal MO-EN.

Preferably, the communication unit may be a wireless communication unit or a wired communication unit.

Preferably, the wireless communication unit may adopt Bluetooth communication, wireless fidelity (WIFI) communication, or 4th-generation/5th-generation (4G/5G) communication.

Preferably, the wired communication unit may include a universal serial bus (USB) communication interface or a serial communication interface, a data conversion module, and a connecting line.

Another technical solution of the present disclosure is implemented as follows. A control method of an e-cigarette for preventing minors from using includes the following steps:

(1) turning on and activating the e-cigarette;
(2) acquiring, by a personal biometric information acquisition unit of the e-cigarette, personal biometric information;
(3) determining, by a storage control unit of the e-cigarette, whether the acquired personal biometric information is valid; if not, returning to the previous step, and if yes, proceeding to the next step;
(4) verifying, by the storage control unit, whether the personal biometric information is authorized; if yes, proceeding to step (11); and if not, proceeding to next step;
(5) issuing, by the e-cigarette, a warning message;
(6) acquiring, by an authorization point, personal biometric information and identity document information of an applicant, where the authorization point is provided with an external device and special software that are authorized;
(7) determining, by the authorization point, whether the applicant is a minor according to the personal biometric information and identity document information; if yes, proceeding to the next step; and if not, proceeding to step (9);
(8) refusing, by the authorization point, to authorize the applicant, and returning to step (6);
(9) connecting, by the authorization point, the e-cigarette of the applicant to the authorized external device, and starting the authorized special software;
(10) entering and saving, by the external device, the personal biometric information of the applicant into the e-cigarette of the applicant, performing an authorization operation, and returning to step (1);
(11) enabling the e-cigarette to enter a standby state, and proceeding to steps (12) and (13);
(12) monitoring, by a mouthpiece of the e-cigarette, whether a user has a smoking action; if yes, entering a smoking process; and returning to the previous step when monitoring that the smoking action is stopped;
(13) determining, by the storage control unit, whether a standby time exceeds a set time; if not, returning to step (11); and if yes, proceeding to the next step; and
(14) prompting, by the e-cigarette, overtime standby, and automatically turning off.

Beneficial Effects

In the present disclosure, the e-cigarette is provided with a personal biometric information acquisition unit to acquire personal biometric information for verification and authorization. The authorization is strictly limited to an authorization point or sale point that is provided with authorized external devices and special software, so as to ensure that the authorization point or sales point does not sell the e-cigarette to minors. After purchasing the e-cigarette, a user can place the e-cigarette arbitrarily. Since it is prohibited to authorize personal biometric information of minors, minors cannot turn on or use the e-cigarette, thereby avoiding adverse effects of the e-cigarette on minors.

DETAILED DESCRIPTION

Optimal Implementations

To make the objectives, technical solutions, and advantages of the present disclosure clearer, the present disclosure is described in further detail below with reference to the drawings and embodiments. It should be understood that the described specific embodiments are merely used to explain the present disclosure, rather than to limit the present disclosure.

It should be noted that the electronic cigarette (e-cigarettes) in the present disclosure includes heat-not-burn (HNB), vaporization and medical types. The liquid substance held in a vaporization device of the e-cigarette includes a common e-liquid, or a medicine-carrying liquid substance, etc.

Embodiment

Figure 1:
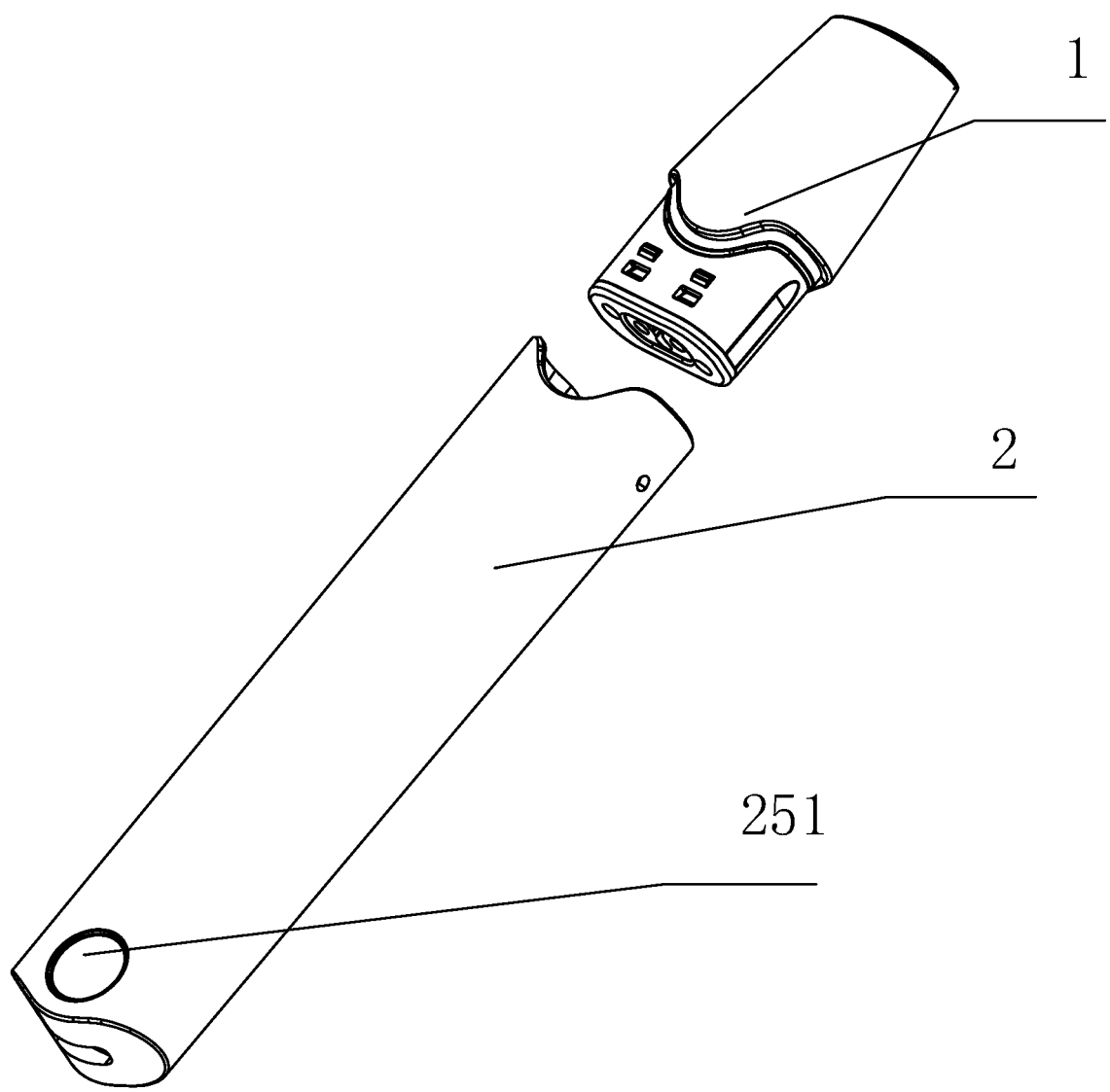
FIG. 1 is a three-dimensional exploded view illustrating a structure of an electronic cigarette (e-cigarette) for preventing minors from using according to the present disclosure.
Figure 2:
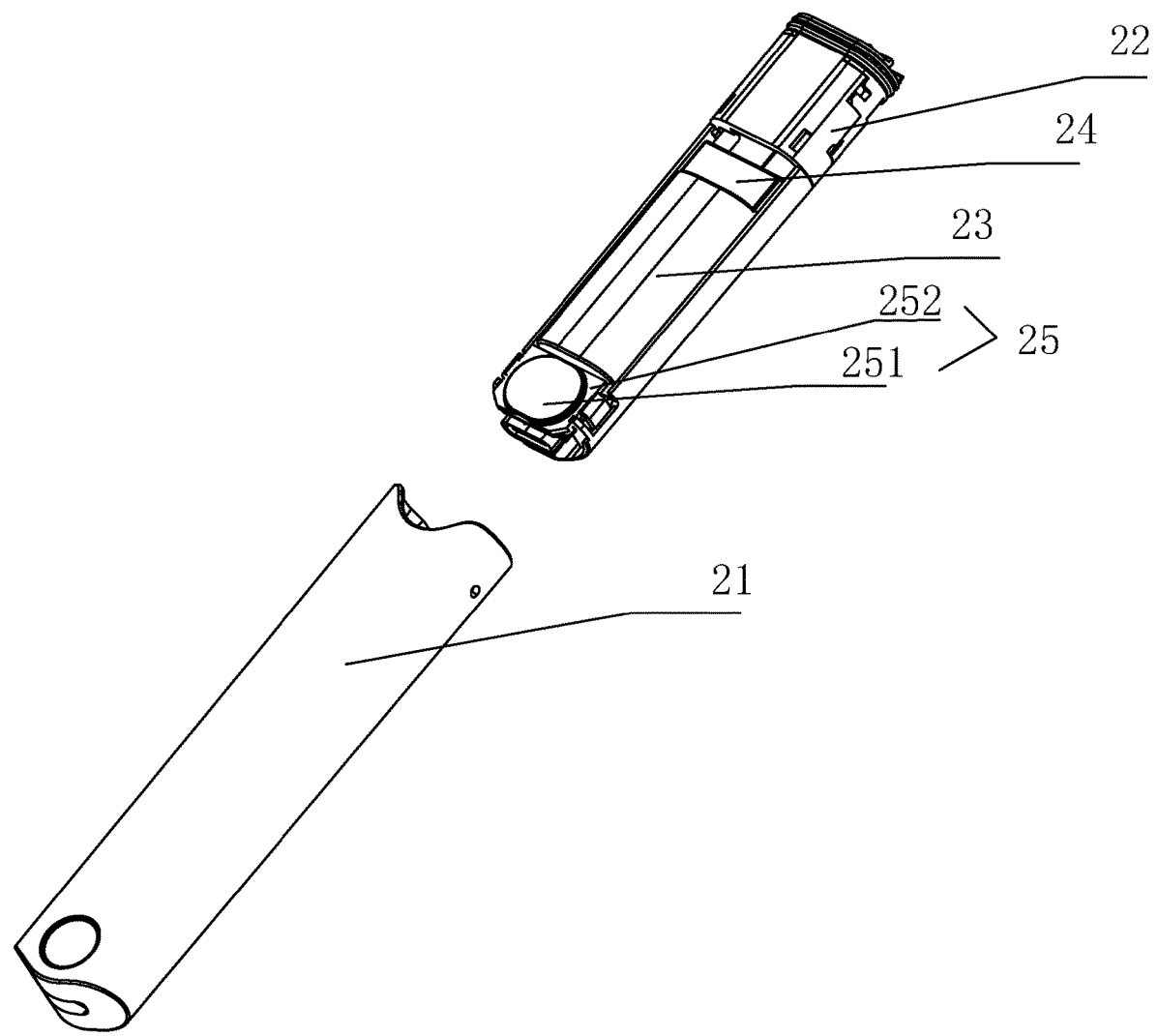
FIG. 2 is a three-dimensional exploded view illustrating a structure of a battery assembly of the e-cigarette for preventing minors from using according to the present disclosure.

As shown in FIGS. 1 and 2, the present disclosure provides an e-cigarette for preventing minors from using. The e-cigarette for preventing minors from using includes a vaporization assembly 1 and a battery assembly 2. An upper end of the vaporization assembly is provided with a mouthpiece, which is held in a mouth of a user for inhalation. The vaporization assembly 1 is provided with a vaporization device (not shown in the figure). The battery assembly 2 includes a casing 21, and a holder 22, a battery 23 and a control circuit 24 that are provided in the casing 21.

Figure 3:
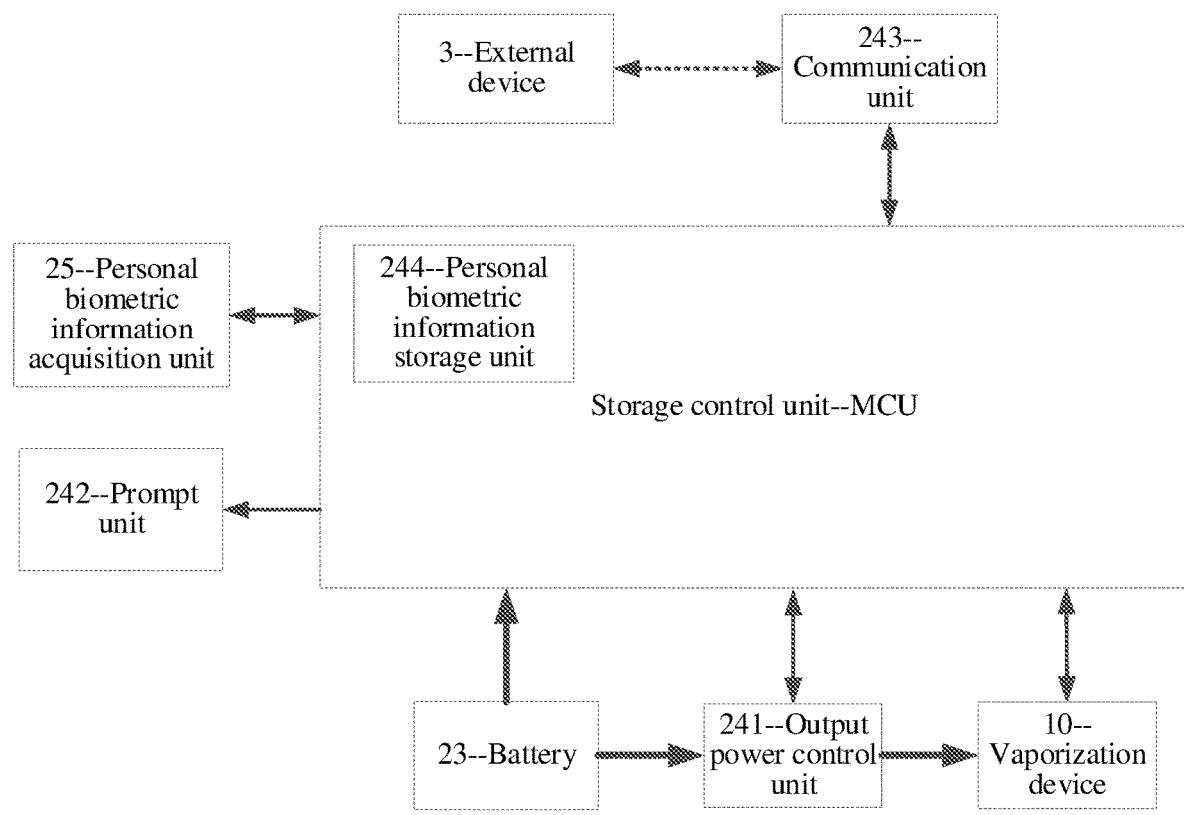
FIG. 3 is a block diagram illustrating a function of a control circuit of the e-cigarette for preventing minors from using according to the present disclosure.

As shown in FIG. 3, the control circuit 24 includes an output power control unit 241, a storage control unit MCU, a personal biometric information acquisition unit 25, a prompt unit 242, and a communication unit 243. The battery 23 is configured to provide power to the vaporization device 10 and the control circuit 24. The vaporization device 10 converts electrical energy into thermal energy or other forms of energy, and heats or vaporizes a substance including a cigarette component to produce a vapor. The personal biometric information acquisition unit 25 is configured to acquire and input a user's personal biometric information into a personal biometric information storage unit 244 in the storage control unit MCU. The storage control unit MCU verifies and identifies the acquired personal biometric information through stored personal biometric information. If the acquired personal biometric information is consistent with the stored personal biometric information, the storage control unit MCU controls the e-cigarette to enter a standby state. In the standby state, the user puts the mouthpiece of the e-cigarette into his/her mouth, and the e-cigarette works and emits a vapor. The communication unit 243 is configured to connect an external device 3 and the storage control unit MCU for data communication. When the storage control unit MCU stores (for the first time) or changes the user's authorized personal biometric information, it utilizes the external device 3 that is authorized, such as a computer or a mobile phone, and authorized special software. It is forbidden to store the personal biometric information of a minor in the e-cigarette, such that the minor cannot use the e-cigarette, thereby avoiding the adverse effect of the e-cigarette on the minor.

The personal biometric information refers to human biometric information with a unique individual characteristic, such as fingerprint information, iris information, face information, and voice information. In this embodiment, the personal biometric information acquisition unit 25 is a fingerprint information acquisition unit 25. In other embodiments, the personal biometric information acquisition unit may also be an iris information acquisition unit, a face information acquisition unit, or a voice information acquisition unit. In other embodiments, the personal biometric information acquisition unit may also be a password information acquisition unit, which is configured for password input.

As shown in FIG. 2, in this embodiment, the fingerprint information acquisition unit 25 includes a fingerprint sensor 251 and a fingerprint processing module 252. The fingerprint sensor 251 may be a circular touchpad with a diameter of 8 mm. It saves the area occupied by the casing and can be conveniently disposed on a surface of the casing, but this also increases the difficulty of matching fingerprint information. To this end, this embodiment strengthens a matching operation function to improve the matching accuracy.

Figure 4:
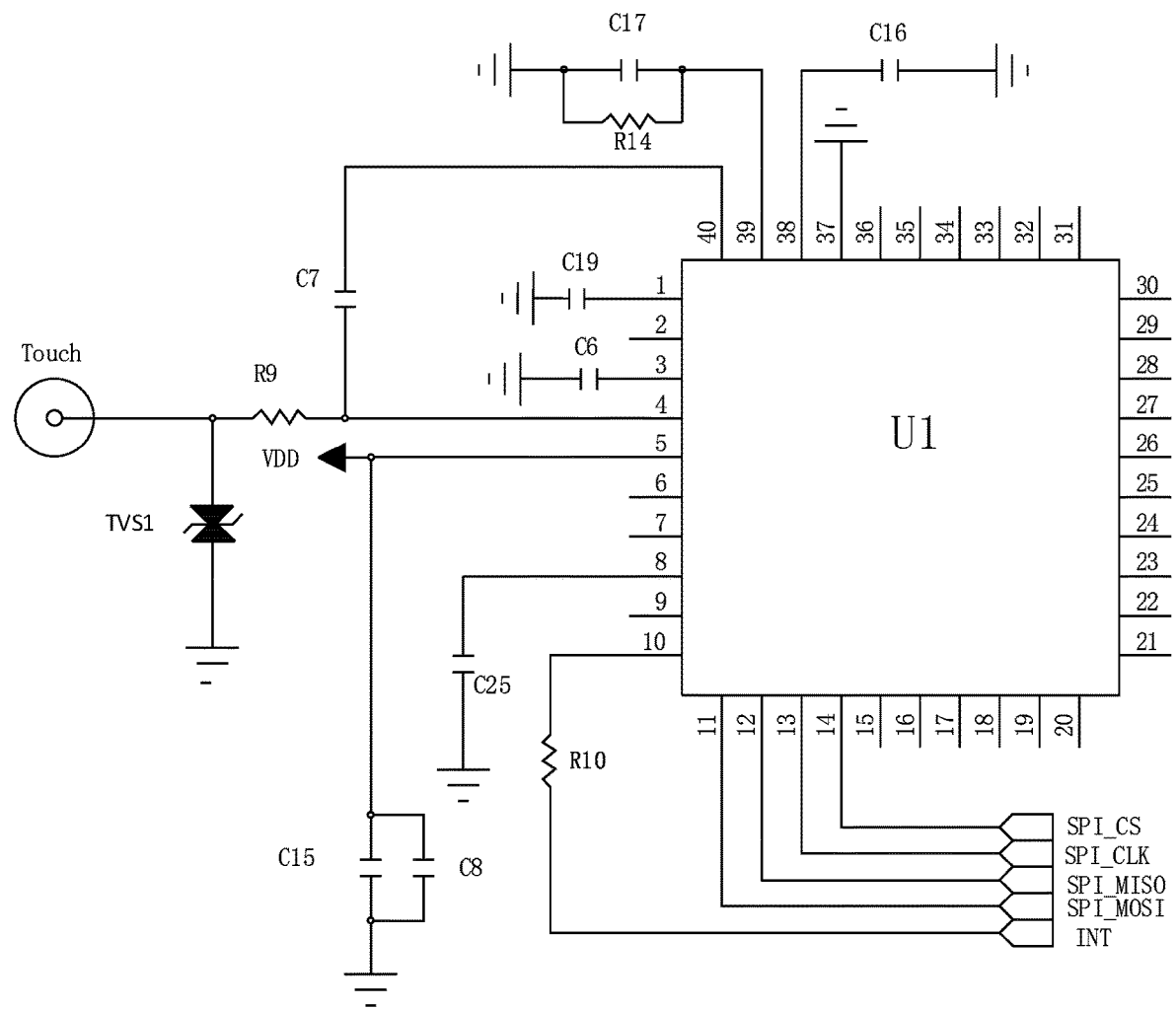
FIG. 4 is a circuit diagram of a fingerprint processing module of the e-cigarette for preventing minors from using according to the present disclosure.

As shown in FIGS. 2 and 4, in this embodiment, the fingerprint processing module 252 includes a chip U1 with 40 pins. In the chip U1, a pin 1 is connected in series with a capacitor C19 and then grounded, and a pin 3 is connected in series with a capacitor C6 and then grounded. A pin 4 is connected to one terminal of a resistor R9, and the other terminal of the resistor R9 is connected to the fingerprint sensor Touch 251 and one terminal of a transient voltage suppressor TVS1. The other terminal of the transient voltage suppressor TVS1 is grounded. A capacitor C7 is connected in series between the pin 4 and a pin 40. A pin 5 is connected to a power supply terminal VDD. The pin 5 is also connected to one terminal of each of parallel capacitors C8 and C15, and the other terminal of each of the parallel capacitors C8 and C15 is grounded. A pin 8 is connected in series with a capacitor C25 and then grounded. A pin 10 is connected to one terminal of a resistor R10, and the other terminal of the resistor R10 is connected to a data interrupt signal terminal INT. A pin 11 is connected to a data input signal terminal SPI-MOSI, and a pin 12 is connected to a data output signal terminal SPI-MISO. A pin 13 is connected to a data clock signal terminal SPI-CLK, and a pin 14 is connected to a communication enable signal terminal SPI-CS. A pin 37 is grounded. A pin 38 is connected in series with a capacitor C16 and then grounded. A pin 39 is connected to one terminal of each of a resistor R14 and a capacitor C17 connected in parallel, and the other terminal of each of the resistor R14 and the capacitor C17 connected in parallel is grounded.

Figure 5:
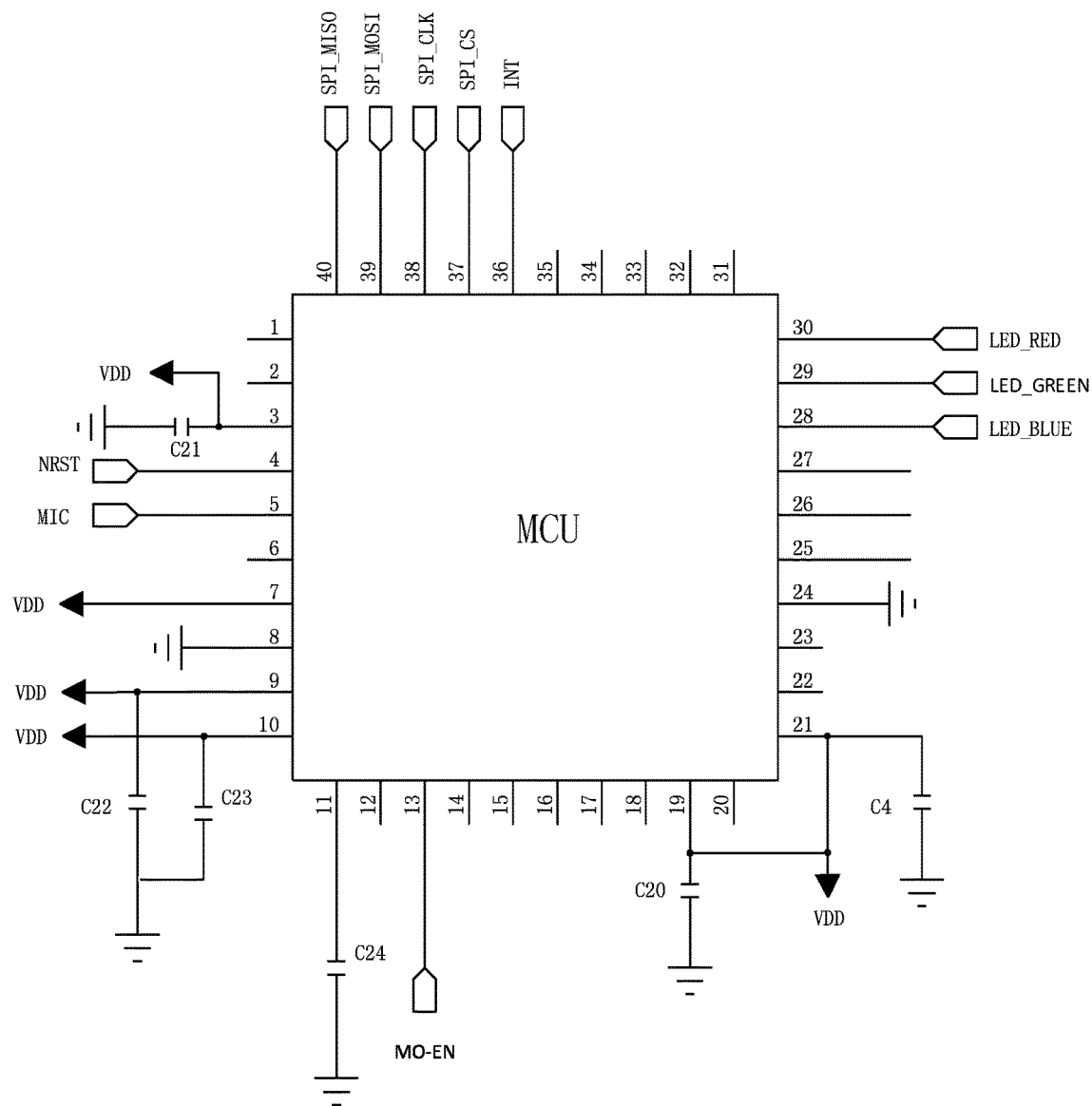
FIG. 5 is a circuit diagram of a storage control unit of the e-cigarette for preventing minors from using according to the present disclosure.

As shown in FIG. 5, in this embodiment, the storage control unit includes a chip MCU with 40 pins. In the chip MCU, a pin 3 is connected to a power supply terminal VDD, and the pin 3 is connected in series with a capacitor C21 and then grounded. A pin 4 is connected to a reset signal terminal NRST, a pin 5 is connected to a microphone signal terminal MIC, a pin 7 is connected to a power supply terminal VDD, and a pin 8 is grounded. A pin 9 and a pin 10 each are connected to a power supply terminal VDD. The pin 9 is also connected in series with a capacitor C22 and then grounded.

The pin 10 is also connected in series with a capacitor C23 and then grounded. A pin 11 is connected in series with a capacitor C24 and then grounded. A pin 13 is connected to a motor drive enable signal terminal MO-EN. A pin 19 and a pin 21 are connected to a power supply terminal VDD. The pin 19 is also connected in series with a capacitor C20 and then grounded. A pin 20 is connected in series with a capacitor C4 and then grounded. A pin 24 is grounded. A pin 28 is connected to a blue light signal terminal LED-BLUE, a pin 29 is connected to a green light signal terminal LED-GREEN, and a pin 30 is connected to a red light signal terminal LED-RED. A pin 36 is connected to a data interrupt signal terminal INT. A pin 37 is connected to a communication enable signal terminal SPI-CS. A pin 38 is connected to a data clock signal terminal SPI-CLK. A pin 39 is connected to a data input signal terminal SPI-MOSI. A pin 40 is connected to a data output signal terminal SPI-MISO.

Figure 6:
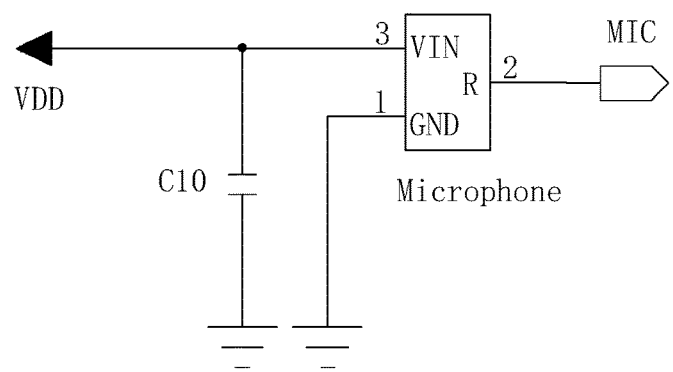
FIG. 6 is a circuit diagram of a microphone of the e-cigarette for preventing minors from using according to the present disclosure.

As shown in FIG. 6, in this embodiment, the microphone signal terminal MIC is connected to a pin 2 of a microphone. A pin 1 of the microphone is grounded. A pin 3 of the microphone is connected to a power supply terminal VDD and one terminal of a capacitor C10, and the other terminal of the capacitor C10 is grounded. The microphone is configured to detect an inhalation airflow or air pressure. When the user inhales through a hole of the mouthpiece, an airflow or a negative pressure is generated in the vaporization assembly 1, which triggers an action of the microphone. Therefore, the microphone acts as a power supply switch of the vaporization device 10.

Figure 7:
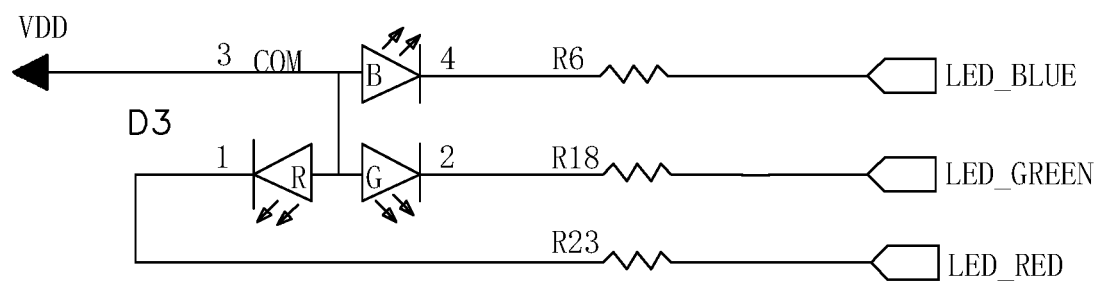
FIG. 7 is a circuit diagram of a light-emitting diode (LED) light of a prompt unit of the e-cigarette for preventing minors from using according to the present disclosure.

As shown in FIG. 7, in this embodiment, the prompt unit includes a tricolor (red, green and blue) light-emitting diode (LED) light D3. An anode of the tricolor LED light D3, that is, a pin 3, is connected to a power supply terminal VDD. A pin 1 of the tricolor LED light D3 is connected to one terminal of a resistor R23, and the other terminal of the resistor R23 is connected to a red light signal terminal LED-RED. A pin 2 of the tricolor LED light D3 is connected to one terminal of a resistor R18, and the other terminal of the resistor R18 is connected to a green light signal terminal LED-GREEN. A pin 4 of the tricolor LED light D3 is connected to one terminal of a resistor R6, and the other terminal of the resistor R6 is connected to a blue light signal terminal LED-BLUE.

Figure 8:
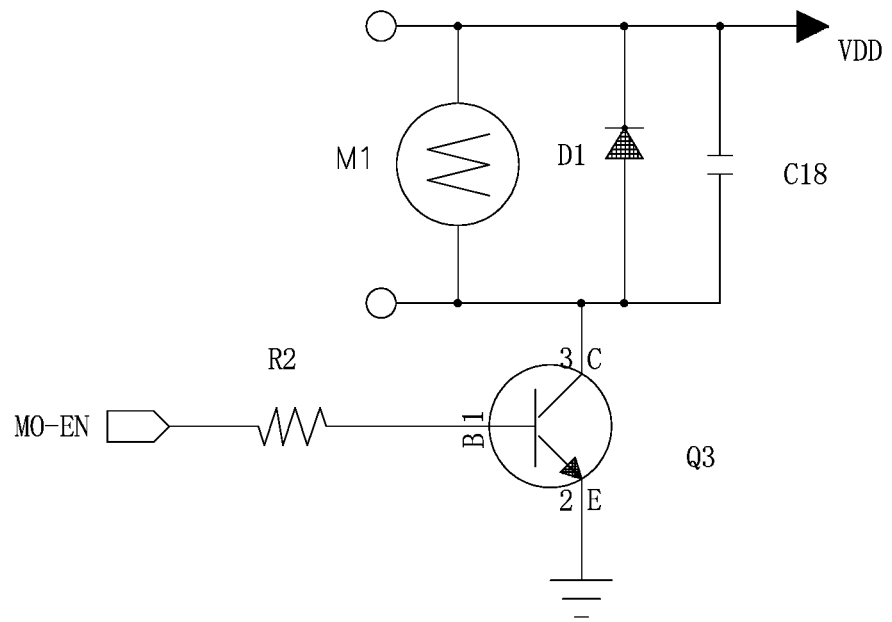
FIG. 8 is a circuit diagram of a vibration motor of a prompt unit of the e-cigarette for preventing minors from using according to the present disclosure.

As shown in FIG. 8, in this embodiment, the prompt unit includes a vibration motor M1. The vibration motor M1 is connected in parallel with a diode D1 and a capacitor C18. A cathode terminal of the diode D1 is connected to a power supply terminal VDD, and an anode terminal of the diode D1 is connected to a collector of a transistor Q3. An emitter of the transistor Q3 is grounded. A base of the transistor Q3 is connected to one terminal of a resistor R2, and the other terminal of the resistor R2 is connected to a motor drive enable signal terminal MO-EN.

In the present disclosure, the communication unit is a wireless communication unit or a wired communication unit. The wireless communication unit may adopt Bluetooth communication, wireless fidelity (WIFI) communication, or $4^{th}$-generation/$5^{th}$-generation (4G/5G) communication. If it is a wired communication unit, it may be provided with a universal serial bus (USB) communication interface or a serial communication interface, a data conversion module, and a connecting line.

In the present disclosure, the prompt unit is a liquid crystal display (LCD) screen, a vibration motor, an indicator light, a buzzer, or a voice announcer.

Figure 9:
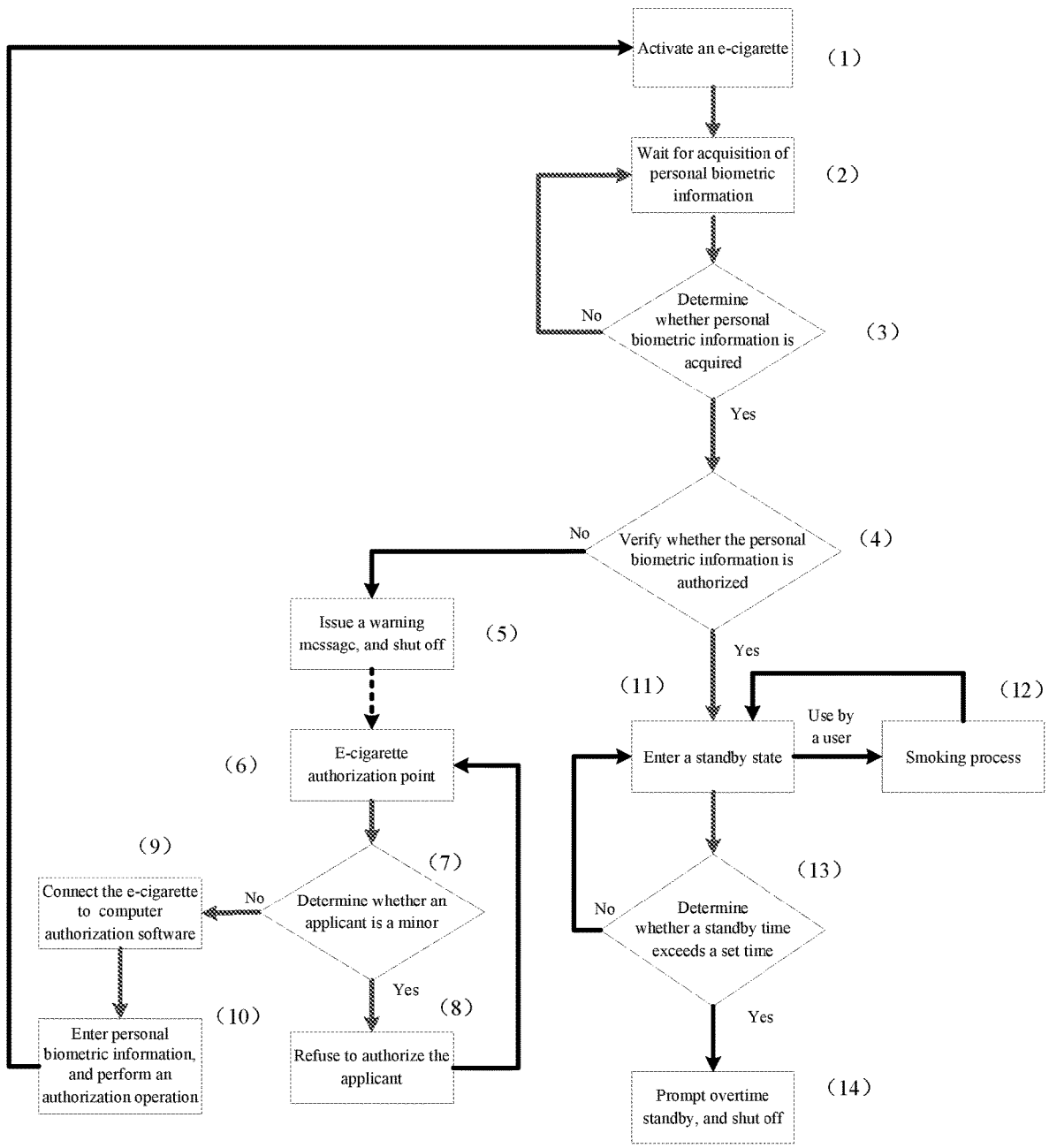
FIG. 9 is a flowchart of a control method of an e-cigarette for preventing minors from using according to the present disclosure.

As shown in FIG. 9, the present disclosure further provides a control method of an e-cigarette for preventing minors from using, including the following steps.
(1) Turn on and activate the e-cigarette.
(2) Acquire, by a personal biometric information acquisition unit of the e-cigarette, personal biometric information. Furthermore, wait for acquisition of personal biometric information such as fingerprint information.
(3) Determine, by a storage control unit of the e-cigarette, whether the acquired personal biometric information is valid; if not, return to the previous step, and if yes, proceed to the next step. Furthermore, determine, by a storage control unit MCU, whether the personal biometric information is acquired; if not, return to the previous step, and if yes, proceed to the next step.
(4) Verify, by the storage control unit, whether the personal biometric information is authorized, that is, determine whether the acquired personal biometric information is consistent with pre-stored personal biometric information; if yes, proceed to step (11); and if not, proceed to next step.
(5) Issue a warning message, indicating that the acquired personal biometric information is inconsistent with the pre-stored personal biometric information.
(6) Acquire, by an authorization point, personal biometric information and identity document information of an applicant, wherein the authorization point is provided with an external device and special software that are authorized. Specifically, carry, by an applicant, the e-cigarette to an authorization point to apply for authorization, where the authorization point is provided with an authorized external device, such as a computer or a mobile phone, and authorized special software.
(7) Determine, by the authorization point, whether the applicant is a minor according to the personal biometric information and identity document information; if yes, proceed to the next step; and if not, proceed to step (9). Specifically, determine, by a staff of the authorization point, whether the applicant is a minor according to the applicant's personal biometric information and identity document information; if yes, proceed to the next step; and if not, proceed to step (9).
(8) Refuse, by the authorization point, to authorize the applicant, and return to step (6).
(9) Connect the e-cigarette to the authorized external device, and start the authorized special software.
(10) Enter and save, by the external device, the applicant's personal biometric information into the e-cigarette, perform an authorization operation, and return to step (1).
(11) Enable the e-cigarette to enter a standby state, and proceed to steps (12) and (13).
(12) Monitor, by a mouthpiece of the e-cigarette, whether a user has a smoking action; if yes, enter a smoking process; and return to the previous step when monitoring that the smoking action is stopped. Specifically, wait for a user's smoking action; enter a smoking process when the user has a smoking action; and return to the previous step when the user stops the smoking action.
(13) Determine, by the storage control unit, whether a standby time exceeds a set time; if not, return to step (11); and if yes, proceed to the next step.
(14) Prompt, by the e-cigarette, overtime standby, and automatically turn off the e-cigarette.

INDUSTRIAL APPLICABILITY

The above described are only preferred embodiments of the present disclosure, and the above-mentioned specific embodiments are not intended to limit the present disclosure. Various variations and modifications may be made within the scope of the technical idea of the present disclosure. However, any retouch, modification or equivalent replacement made by those of ordinary skill in the art according to the above description should fall within the protection scope of the present disclosure.

The invention claimed is:

1. An electronic cigarette, e-cigarette, for preventing minors from using comprising a vaporization assembly (1) and a battery assembly (2), wherein the vaporization assembly (1) is provided therein with a vaporization device (10); the battery assembly (2) comprises a casing (21), and a holder (22), a battery (23) and a control circuit (24) that are provided in the casing (21); the control circuit (24) comprises an output power control unit (241), a storage control unit, a personal biometric information acquisition unit (25), a prompt unit (242), and a communication unit (243); the battery (23) is configured to provide power to the vaporization device (10) and the control circuit (24); the vaporization device (10) is configured to produce a vapor after being energized; the personal biometric information acquisition unit (25) is configured to acquire and input a user's personal biometric information into the storage control unit; the storage control unit is configured to identify the acquired personal biometric information based on pre-stored personal biometric information, and control the e-cigarette to enter a standby state; the communication unit (243) is configured to connect an external device (3) and the storage control unit for data communication; when the storage control unit stores or changes the user's personal biometric information, the storage control unit utilizes the external device (3) and special software that are authorized to complete the storage or change; and personal biometric information of minors are forbidden to be stored in the e-cigarette by determining, by an authorization point, whether an applicant is a minor according to the personal biometric information; and refusing, by the authorization point, to authorize the minor;

wherein the storage control unit comprises a chip (MCU) with 40 pins; in the chip (MCU), a pin 3 is connected to a power supply terminal (VDD); the pin 3 is also connected in series with a capacitor (C21) and then grounded; a pin 4 is connected to a reset signal terminal (NRST), a pin 5 is connected to a microphone signal terminal (MIC), a pin 7 is connected to a power supply terminal (VDD), and a pin 8 is grounded; a pin 9 and a pin 10 each are connected to a power supply terminal (VDD); the pin 9 is also connected in series with a capacitor (C22) and then grounded; the pin 10 is also connected in series with a capacitor (C23) and then grounded; a pin 11 is connected in series with a capacitor (C24) and then grounded; a pin 13 is connected to a motor drive enable signal terminal (MO-EN); a pin 19 and a pin 21 are connected to a power supply terminal (VDD); the pin 19 is also connected in series with a capacitor (C20) and then grounded; a pin 20 is connected in series with a capacitor (C4) and then grounded; a pin 24 is grounded; a pin 28 is connected to a blue light signal terminal (LED-BLUE), a pin 29 is connected to a green light signal terminal (LED-GREEN), and a pin 30 is connected to a red light signal terminal (LED-RED); a pin 36 is connected to a data interrupt signal terminal (INT); a pin 37 is connected to a communication enable signal terminal (SPI-CS); a pin 38 is connected to a data clock signal terminal (SPI-CLK); a pin 39 is connected to a data input signal terminal (SPI-MOSI); and a pin 40 is connected to a data output signal terminal (SPI-MISO); and wherein the microphone signal terminal (MIC) is connected to a pin 2 of a microphone; a pin 1 of the microphone is grounded; a pin 3 of the microphone is connected to a power supply terminal (VDD) and one terminal of a capacitor (C10); and the other terminal of the capacitor (C10) is grounded.

2. The e-cigarette for preventing minors from using according to claim 1, wherein the personal biometric information acquisition unit (25) is a fingerprint information acquisition unit, an iris information acquisition unit, a face information acquisition unit, or a voice information acquisition unit.

3. The e-cigarette for preventing minors from using according to claim 2, wherein the fingerprint information acquisition unit comprises a fingerprint sensor (251) and a fingerprint processing module (252).

4. The e-cigarette for preventing minors from using according to claim 3, wherein the fingerprint sensor (251) is a circular touchpad with a diameter of 8 mm.

5. The e-cigarette for preventing minors from using according to claim 4, wherein the fingerprint processing module (252) comprises a chip (U1) with 40 pins; in the chip (UI), a pin 1 is connected in series with a capacitor (C19) and then grounded, a pin 3 is connected in series with a capacitor (C6) and then grounded, and a pin 4 is connected to one terminal of a resistor (R9); the other terminal of the resistor (R9) is connected to the fingerprint sensor (251) and one terminal of a transient voltage suppressor (TVS1), and the other terminal of the transient voltage suppressor (TVS1) is grounded; a capacitor (C7) is connected in series between the pin 4 and a pin 40; a pin 5 is connected to a power supply terminal (VDD); the pin 5 is also connected to one terminal of each of parallel capacitors (C8, C15), and the other terminal of each of the parallel capacitors (C8, C15) is grounded; a pin 8 is connected in series with a capacitor (C25) and then grounded; a pin 10 is connected to one terminal of a resistor (R10), and the other terminal of the resistor (R10) is connected to a data interrupt signal terminal (INT); a pin 11 is connected to a data input signal terminal (SPI-MOSI), a pin 12 is connected to a data output signal terminal (SPI-MISO), a pin 13 is connected to a data clock signal terminal (SPI-CLK), and a pin 14 is connected to a communication enable signal terminal (SPI-CS); a pin 37 is grounded, and a pin 38 is connected in series with a capacitor (C16) and then grounded; and a pin 39 is connected to one terminal of each of a resistor (R14) and a capacitor (C17) connected in parallel, and the other terminal of each of the resistor (R14) and the capacitor (C17) connected in parallel is grounded.

6. The e-cigarette for preventing minors from using according to claim 1, wherein the prompt unit (242) is a liquid crystal display, LCD, screen, a vibration motor, an indicator light, a buzzer, or a voice announcer.

7. The e-cigarette for preventing minors from using according to claim 1, wherein the prompt unit (242) comprises red, green and blue light-emitting diode, LED, lights; anodes of the red, green and blue LED lights are connected to a power supply terminal (VDD); a cathode of the red LED light is connected to one terminal of a resistor (R23), and the other terminal of the resistor (R23) is connected to a red light signal terminal (LED-RED); a cathode of the green LED light is connected to one terminal of a resistor (R18), and the other terminal of the resistor (R18) is connected to a green light signal terminal (LED-GREEN); and a cathode of the blue LED light is connected to one terminal of a resistor (R6), and the other terminal of the resistor (R6) is connected to a blue light signal terminal (LED-BLUE).

8. The e-cigarette for preventing minors from using according to claim 1, wherein the prompt unit (242) comprises a vibration motor, which is connected in parallel with a diode (Bowen) and a capacitor (C18); a cathode terminal of the diode (Bowen) is connected to a power supply terminal (VDD), and an anode terminal of the diode (Bowen) is connected to a collector of a transistor (Q3); an emitter of the transistor (Q3) is grounded; and a base of the transistor (Q3) is connected to one terminal of a resistor (R2), and the other terminal of the resistor (R2) is connected to a motor drive enable signal terminal (MO-EN).

9. The e-cigarette for preventing minors from using according to claim 1, wherein the communication unit (243) is a wireless communication unit or a wired communication unit.

10. The e-cigarette for preventing minors from using according to claim 9, wherein the wireless communication unit adopts Bluetooth communication, wireless fidelity, WIFI, communication, or 4th-generation/5th-generation, 4G/5G, communication.

11. The e-cigarette for preventing minors from using according to claim 9, wherein the wired communication unit comprises a universal serial bus, USB, communication interface or a serial communication interface, a data conversion module, and a connecting line.

\* \* \* \* \*